(12) United States Patent
Qi et al.

(10) Patent No.: US 10,885,812 B2
(45) Date of Patent: Jan. 5, 2021

(54) THORACIC ARCH SPRING TEACHING AID

(71) Applicant: TELLYES SCIENTIFIC INC., Tianjin (CN)

(72) Inventors: Zinan Qi, Tianjin (CN); Biao Liu, Tianjin (CN)

( * ) Notice: Subject to any disclaimer, the term of this patent is extended or adjusted under 35 U.S.C. 154(b) by 0 days.

(21) Appl. No.: 16/501,558

(22) PCT Filed: Nov. 7, 2017

(86) PCT No.: PCT/CN2017/000671
§ 371 (c)(1),
(2) Date: May 2, 2019

(87) PCT Pub. No.: WO2018/086237
PCT Pub. Date: May 17, 2018

(65) Prior Publication Data
US 2020/0066186 A1     Feb. 27, 2020

(30) Foreign Application Priority Data

Nov. 8, 2016   (CN) .......................... 2016 1 0981973

(51) Int. Cl.
*G09B 23/28*     (2006.01)
(52) U.S. Cl.
CPC ................... *G09B 23/288* (2013.01)
(58) Field of Classification Search
CPC .............. G09B 23/288; G09B 23/32
See application file for complete search history.

(56) References Cited

U.S. PATENT DOCUMENTS

| | | | | |
|---|---|---|---|---|
| 3,872,609 A * | 3/1975 | Smrcka | ............... | G09B 23/288 434/265 |
| 5,249,968 A * | 10/1993 | Brault | ................. | G09B 23/288 267/122 |
| 5,256,070 A * | 10/1993 | Garth | .................. | G09B 23/288 434/265 |
| 5,330,514 A * | 7/1994 | Egelandsdal | ........ | G09B 23/288 434/265 |
| 5,423,685 A * | 6/1995 | Adamson | ............. | G09B 23/288 434/265 |

(Continued)

*Primary Examiner* — Malina D. Blaise
(74) *Attorney, Agent, or Firm* — Panterrain IP Law; Charles Liu

(57) ABSTRACT

A thoracic arch spring teaching aid, comprising a thoracic arch spring (1) having a contour similar to that of the sternum of the human body. The thoracic arch spring (1) has an area enclosed therein as a simulated thoracic cavity (100); the thoracic arch spring (1) comprises a plurality of arch-shaped spring pieces (11); limit spring plates (21, 22) for pressing the spring pieces (11) are provided above and/or below the thoracic arch spring (1); the limit spring plates (21, 22) comprise base portions (210, 220) contacting the spring pieces (11) and extension portions (211, 221, 211', 221') located at two sides of the base portions (210, 220); the extension portions (211, 221, 211', 221') extend along the projections of the spring pieces (11) on the plane where the base portions (210, 220) are located. The teaching aid can prevent the spring pieces (11) from forming a shearing force region when the spring pieces (11) are pressed; thus, deformation or breakage is avoided, and the service life is prolonged.

9 Claims, 6 Drawing Sheets

(56) References Cited

U.S. PATENT DOCUMENTS

| | | | | |
|---|---|---|---|---|
| 5,885,084 A | * | 3/1999 | Pastrick | G09B 23/288 |
| | | | | 434/265 |
| 6,227,864 B1 | * | 5/2001 | Egelandsdal | G09B 23/288 |
| | | | | 434/262 |
| 7,223,103 B2 | * | 5/2007 | Cantrell | G09B 23/288 |
| | | | | 434/262 |
| 8,382,485 B2 | * | 2/2013 | Bardsley | G09B 23/30 |
| | | | | 434/262 |
| 9,953,548 B2 | * | 4/2018 | Fradette | G09B 23/288 |
| 10,339,834 B2 | * | 7/2019 | Cobb | G09B 23/303 |
| 2013/0330698 A1 | * | 12/2013 | Yang | G09B 23/288 |
| | | | | 434/265 |
| 2015/0125840 A1 | * | 5/2015 | Pastrick | G09B 23/288 |
| | | | | 434/265 |
| 2016/0078783 A1 | * | 3/2016 | Sullenberger | G09B 23/288 |
| | | | | 434/274 |
| 2016/0189569 A1 | * | 6/2016 | Been | G09B 23/34 |
| | | | | 434/274 |
| 2017/0011656 A1 | * | 1/2017 | Cobb | G09B 23/32 |
| 2018/0338887 A1 | * | 11/2018 | Gold | A61H 31/007 |
| 2018/0342178 A1 | * | 11/2018 | Gold | A61H 31/004 |

* cited by examiner

THORACIC ARCH SPRING TEACHING AID

FIELD OF THE INVENTION

The present invention is in the field of simulated human body teaching aids, and more particularly relates to a thoracic arch spring teaching aid.

BACKGROUND OF THE INVENTION

Sudden cardiac arrest refers to a sudden stop of the heart in unforeseen circumstances and time with various of reasons, resulting in a sudden suspension of effective heart pump function and effective circulation and causing severe ischemia, hypoxia and metabolism disorders of systematic tissue cells, and, it may cause immediate lose of lives if not rescued in time. Sudden cardiac arrest is different from any cardiac arrest in an end stage of chronic disease, where the patient may be saved life and recovered if appropriate and effective resuscitation measures are taken in time. Once sudden cardiac arrest occurs, if resuscitation measures were not immediately and promptly taken, irreversible damage would have been caused to the brain and other major organs of the human body in case of 4 to 6 minutes of delay. After sudden cardiac arrest occurred, therefore, cardiopulmonary resuscitation must be performed immediately on site in order to win the most precious time for further rescue until the life can be saved. Therefore, cardiopulmonary resuscitation is a basic medical skill that medical personnel must have, and a practical skill of family rescue for regular people to learn as well.

For the teaching of cardiopulmonary resuscitation, a thoracic arch spring teaching aid is often used to simulate the human body. A conventional thoracic arch spring teaching aid usually includes a thoracic arch spring having a contour similar to that of a sternum of a human body, were the thoracic arch spring comprises a plurality of arch-shaped spring pieces, a guiding mechanism positioned in the simulated thoracic cavity surrounded by the thoracic arch spring, and an upper limit plate and a lower limit plate provided at an upper end and lower end of the thoracic arch spring. The guiding mechanism comprises a guide sleeve and a guide rod located in the guide sleeve, and the guide sleeve and the guide rod are respectively mounted on the upper limit plate and lower limit plate. In a teaching process, the thoracic arch spring is pressed from the top down, and the spring pieces is deformed upon pressed. However, for the conventional thoracic arch spring teaching aid, upon repeated pressing, the portion of the spring pieces which is in contact with the ends of the upper and lower limit plates forms a shear zone that is subjected to a large shearing force, and thus deformation and breakage would easily occur to cause the teaching aid unusable.

SUMMARY OF THE INVENTION

Accordingly, it is an object of the present invention to overcome the deficiencies of the conventional technologies and to provide a thoracic arch spring teaching aid that is less prone to deformation and breakage, thereby ensuring its normal use.

To achieve the above object, a thoracic arch spring teaching aid according to the embodiments of the present invention comprises a thoracic arch spring having a contour similar to that of a sternum of a human body, wherein: the thoracic arch spring has a space enclosed therein as a simulated thoracic cavity; the thoracic arch spring comprises a plurality of arch-shaped spring pieces; limit spring plates for pressing the spring pieces are provided above and/or below the thoracic arch spring; the limit spring plates comprise base portions in contact with the spring pieces and extension portions located at two sides of the base portions; the extension portions extend along a projections of the spring pieces on a plane where the base portions are located.

The ends of the extension portions away from the base portions are curved

The thoracic arch spring is mounted on a mounting plate below, and a spacer is disposed between the mounting plate and the limit spring plate located below the thoracic arch spring.

The spacer is a rubber pad.

A lower pressing plate for pressing the spring piece is disposed at a lower portion of the simulated thoracic cavity, and the lower pressing plate comprises fins at two sides attached onto the spring piece, and the ends of the fins are respectively in an arc shape.

The thoracic arch spring teaching aid further comprises a guiding mechanism connected to the upper and lower ends of the thoracic arch spring.

The guiding mechanism comprises a guide sleeve and a guide rod located in the guide sleeve.

The guiding mechanism is mounted at one end to the mounting plate and at the other end to the limit spring plate located above the thoracic arch spring.

An upper pressing plate for pressing the spring piece is disposed at an upper portion of the simulated thoracic cavity.

The extension portions respectively have a curved end that is curved away from the spring piece.

With the above features of the thoracic arch spring teaching aid, where the limit spring plates are respectively provided above and below the thoracic arch spring, and the limit spring plates respectively include extension portion at the two sides of the base portions, in a unused state the base portions are pressed and attached onto the spring pieces, and the spacing between the extension portions and the spring pieces increases gradually in the direction away from the base portions; in use when the thoracic arch spring is pressed, the extension portions are pressed and attached to the spring pieces, and the area where the spring pieces is attached gradually increases as the spring pieces gradually deforms. The lengths of the extension portions are properly set such that the ends of the extending portions are still spaced from the spring pieces even when the spring pieces deforms to its maximum extent, and thus no shear area will be formed when the spring pieces is pressed so as to avoid deformation or breakage and increase service life.

DETAILED DESCRIPTION OF THE EMBODIMENTS

Figure 1:
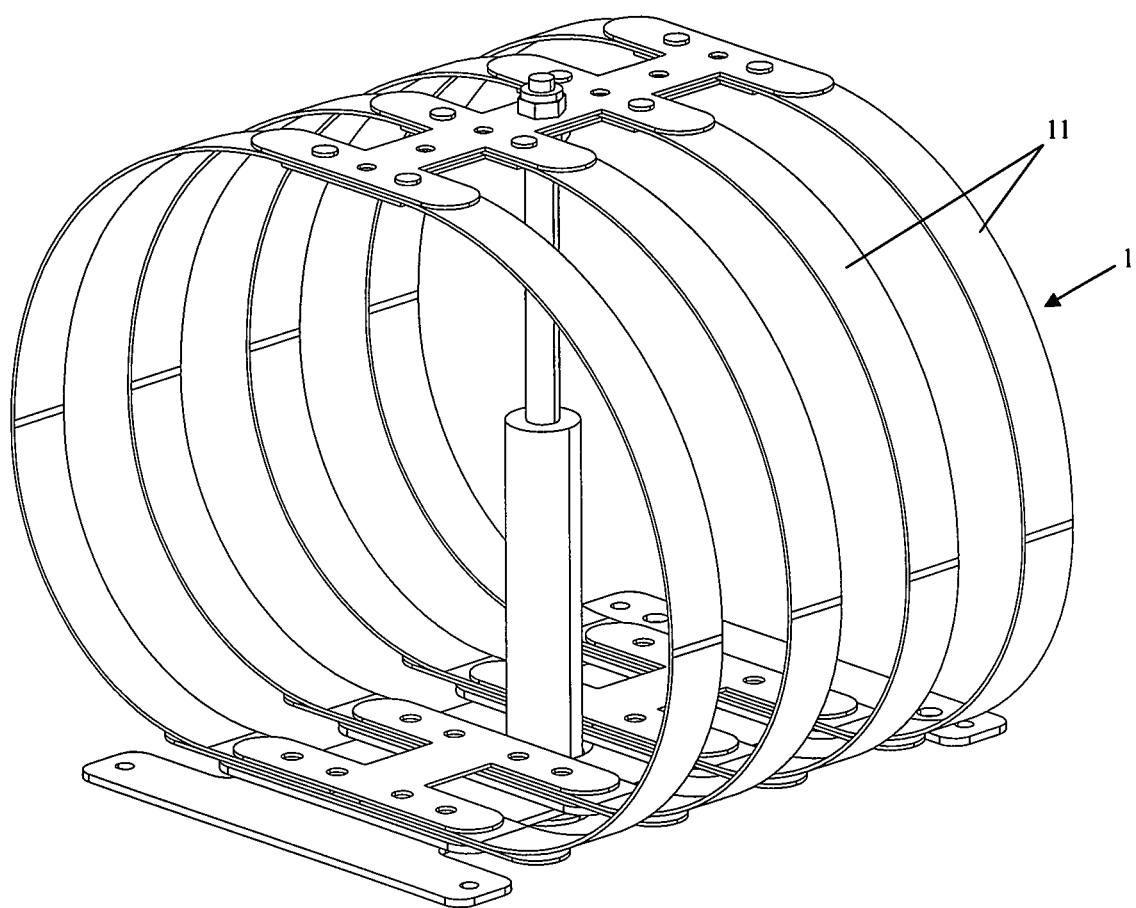
FIG. 1 illustrates schematically a perspective view of an thoracic arch spring model according to an embodiment of the present invention.
Figure 2:
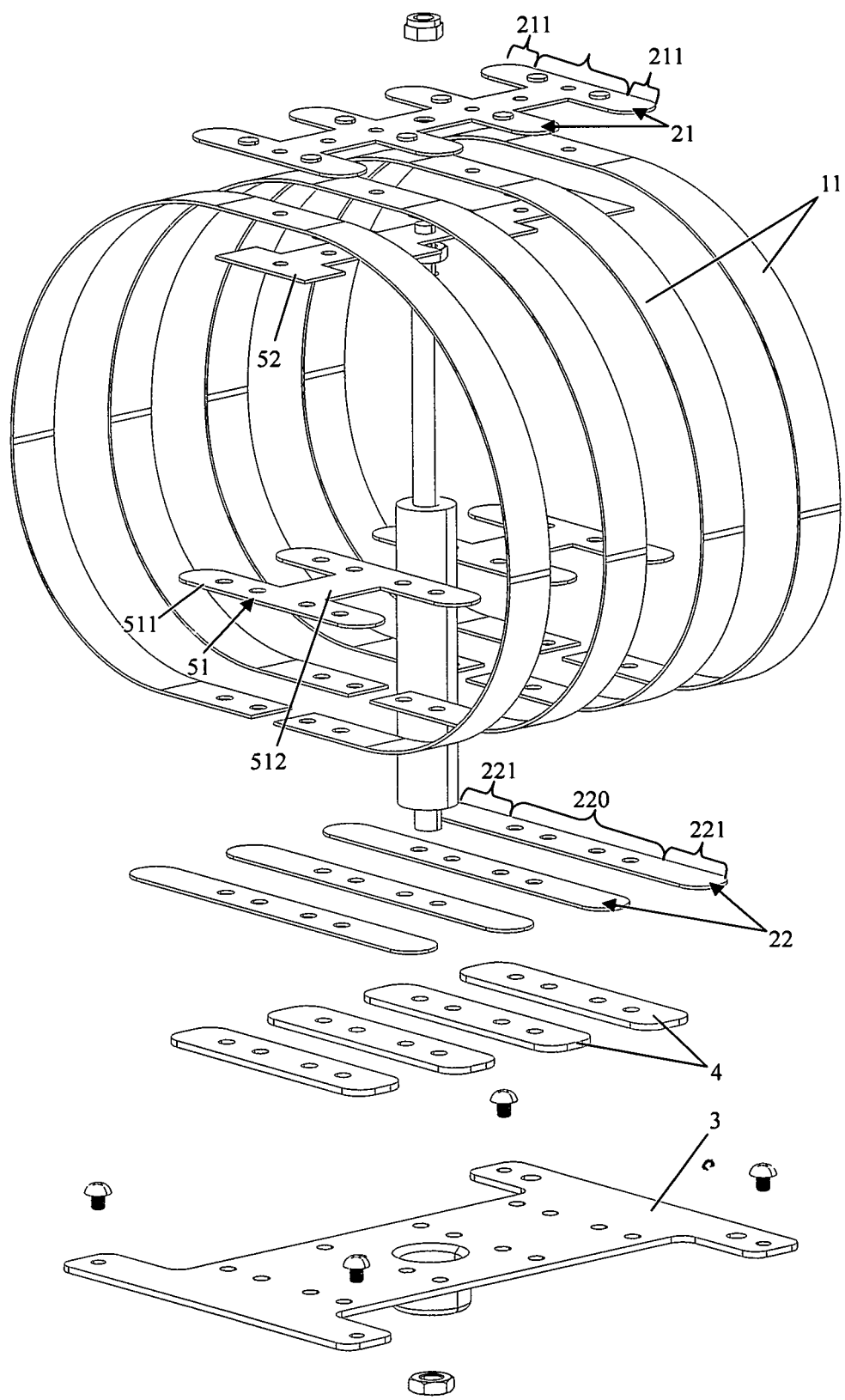
FIG. 2 is an exploded perspective view of the model of FIG. 1.
Figure 3:
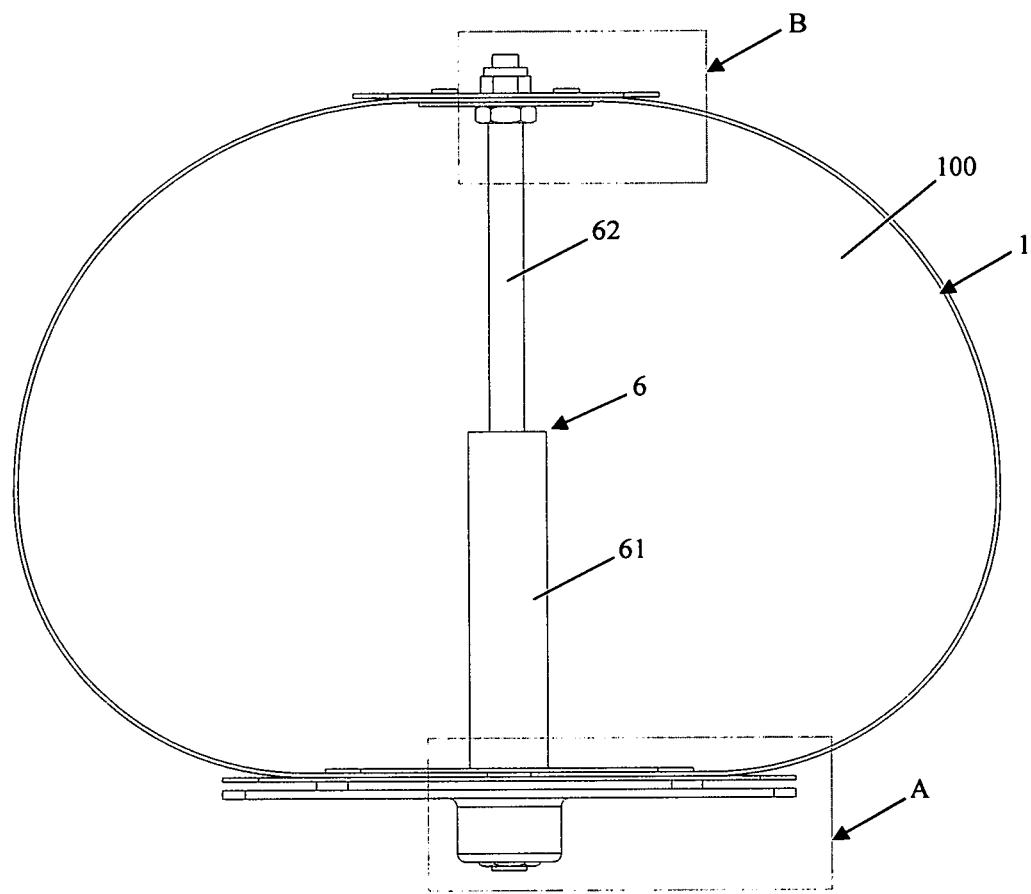
FIG. 3 is a front view of the model according to an embodiment of the present invention.
Figure 4:
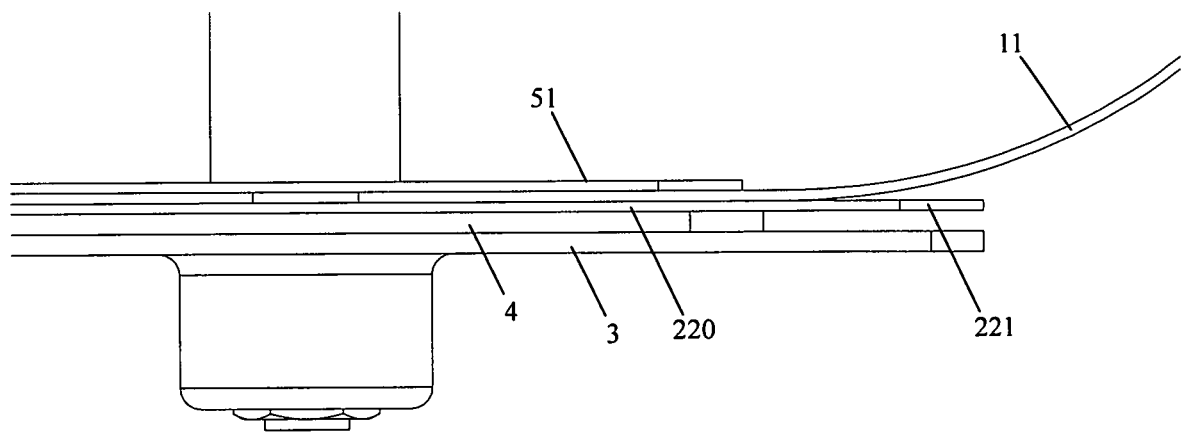
FIG. 4 is an enlarged view of the portion A of FIG. 3.

The invention will be further described in detail below with reference to the drawings and specific embodiments.

Example 1

As shown in FIGS. 1-7, this example provides a thoracic arch spring teaching aid, comprising a thoracic arch spring 1 similar to a human sternum contour, wherein the thoracic arch spring 1 has a space enclosed therein as a simulated thoracic cavity 100; and the thoracic arch spring 1 comprises a plurality of arch-shaped spring pieces 11.

An upper limit spring plate 21 for pressing downward the spring pieces 11 is provided above the thoracic arch spring 1, and a lower limit spring plate 22 for pressing upward the spring pieces 11 is provided below the thoracic arch spring 1; the upper and lower limit spring plates 21, 22 respectively comprise base portions 210, 220 in contact with the spring springs 11 and extension portions 211, 221 located at two sides of the base portions 210, 220; the extension portions 211, 221 extend along the projection of the spring pieces 11 on the plane of the base portions 210, 220. The ends of the extension portions 211, 221 away from the base portions 210, 220 are curved.

With the above features of the thoracic arch spring teaching aid, where the upper and lower limit spring plates 21, 22 are respectively provided above and below the thoracic arch spring 1, and the upper and lower limit spring plates 21, 22 respectively include extension portion at the two sides of the base portions 210, 220, in a unused state the base portions 210, 220 are pressed and attached onto the spring pieces 11, and the spacing between the extension portions 211, 221 and the spring pieces 11 increases gradually in the direction away from the base portions 210, 220; in use when the thoracic arch spring 1 is pressed, the extension portions 211, 221 are pressed and attached to the spring pieces 11, and the area where the spring pieces 11 is attached gradually increases as the spring pieces 11 gradually deforms. The lengths of the extension portions 211, 221 are properly set such that the ends of the extending portions 211 and 221 are still spaced from the spring pieces 11 even when the spring pieces 11 deforms to its maximum extent, and thus no shear area will be formed when the spring pieces 11 is pressed so as to avoid deformation or breakage and increase service life.

Figure 5:
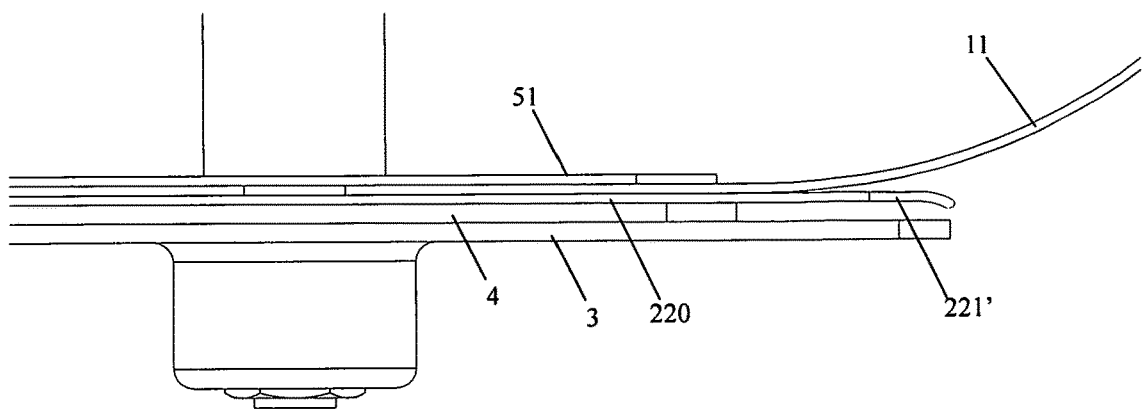
FIG. 5 is a view like in FIG. 4, wherein the extension portion of the lower limit spring plate has a curved end.
Figure 6:
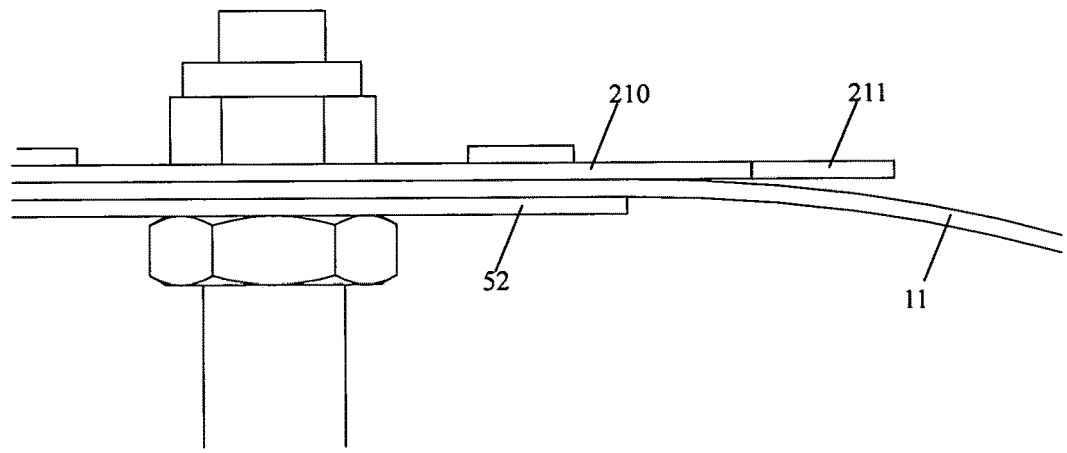
FIG. 6 is an enlarged view of the portion B of FIG. 3.
Figure 7:
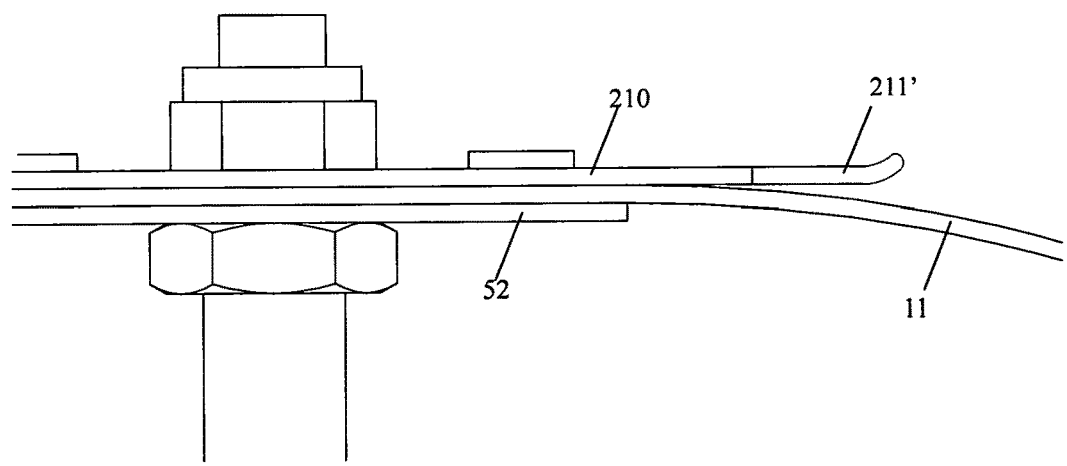
FIG. 7 is a view like in FIG. 4, wherein the extension portion of the lower limit spring plate has a curved end.
Figure 8:
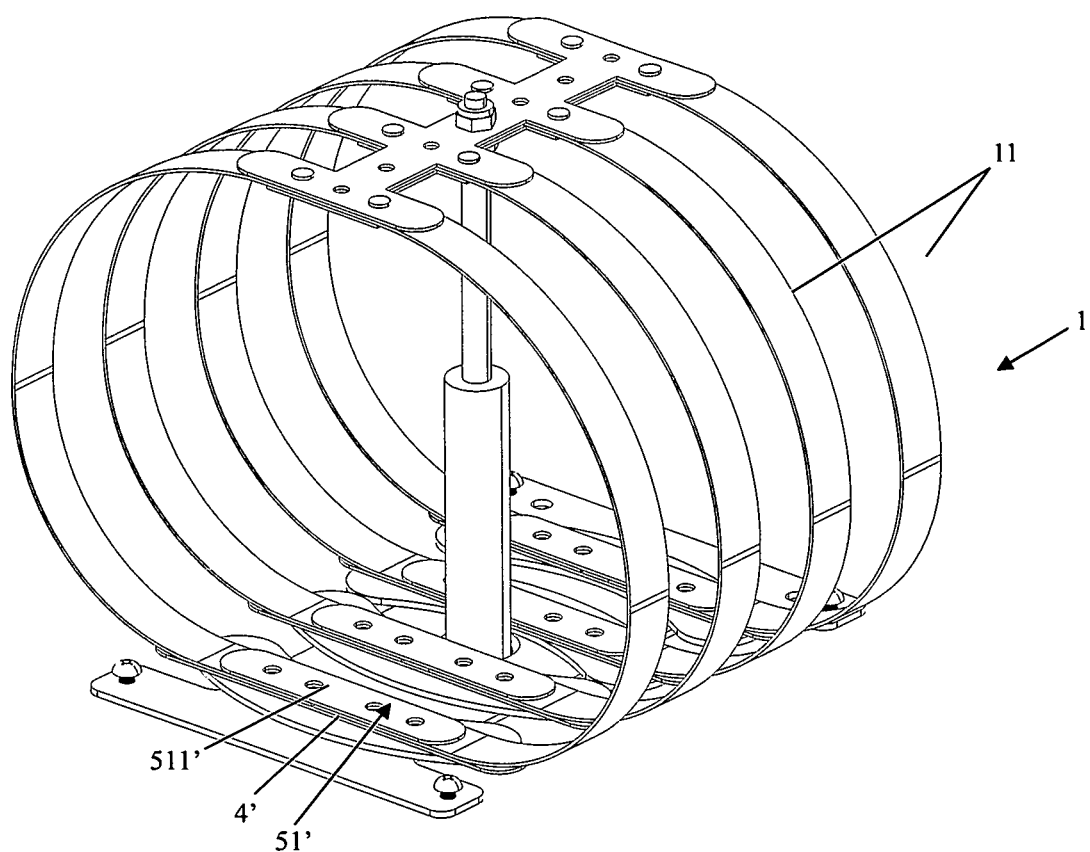
FIG. 8 illustrates schematically a perspective view of an thoracic arch spring model according to another embodiment of the present invention.
Figure 9:
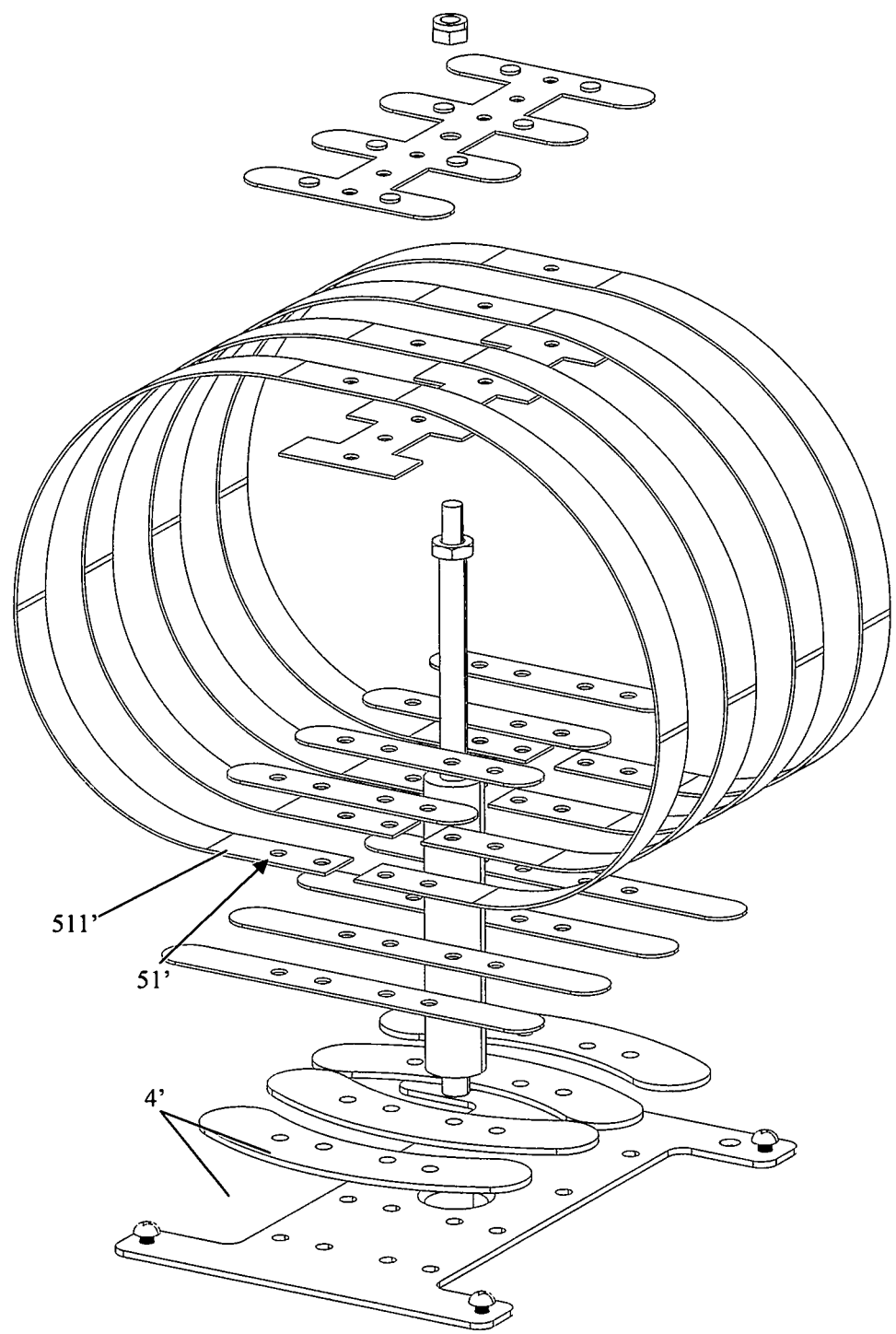
FIG. 9 is an exploded perspective view of the model of FIG. 8.

As shown in FIGS. 5 and 7, the upper and lower limit spring plates 21, 22 respectively include base portions 210, 220, and extension portions 211', 221' located at the two sides of the base portions 210, 220, the extension portion 211', 221' respectively have curved ends that are curved away from the spring pieces. The ends of the extension portions 211', 221' are arranged in a curved shape which can form an effective cushioning zone, and further avoid the formation of shear forces when the spring pieces is bent by pressure.

As a modification of this embodiment, it is also possible to provide only the upper limit spring plate 21, or only the lower limit spring plate 22, which is within the scope of the present invention.

The thoracic arch spring 1 is mounted on a lower mounting plate 3, and a spacer 4 is disposed between the mounting plate 3 and the lower limit spring plate 22 located below the thoracic arch spring 1. The use of the spacer 4 prevents the lower limit spring plate 22 from coming into direct contact with the mounting plate 3 so as to avoid damage to the lower limit spring plate 22 when pressed.

The spacer 4 may be a rubber pad or a pad having a cushioning function of other materials.

A lower pressing plate 51 for pressing downward the spring pieces 11 is disposed at a lower portion of the simulated thoracic cavity 100. The lower pressing plate 51 in a H shape comprises fins 511 at two sides attached onto the spring piece 11 and connecting piece 512 to connect the fins 511, and the ends of the fins 511 are respectively in an arc shape.

The thoracic arch spring teaching aid further includes a guiding mechanism 6 connected to the upper and lower ends of the thoracic arch spring 1.

The guiding mechanism 6 includes a guide sleeve 61 and a guide rod 62 located in the guide sleeve 61.

The guiding mechanism 6 is attached to the mounting plate 3 at one end and to the upper limit spring plate 21 above the thoracic arch spring 1 at the other end.

An upper pressing plate 52 for pressing the spring pieces 11 upward is provided at an upper portion of the simulated thoracic cavity 100.

Example 2

This Example 2 differs from Example 1 in that the spacer 4' is in a curved sheet shape, and the lower pressing plate 51' includes a plurality of straight plate-shaped fins 511'.

It is apparent that the above-described examples are merely illustrative, and are not intended to limit the embodiments. Other variations or modifications of the various forms may be made by a person of ordinary skills in the art in light of the above description. There is no need and no way to exhaust all of the embodiments. Any obvious changes or variations derived there from should be deemed within the scope of the invention.

The invention claimed is:

1. A thoracic arch spring teaching aid, comprising a thoracic arch spring having a contour of a simulated sternum of a human body, wherein: the thoracic arch spring has a space enclosed therein as a simulated thoracic cavity; the thoracic arch spring comprises a plurality of arch-shaped spring pieces; limit spring plates for pressing the spring pieces are provided above and/or below the thoracic arch spring; the limit spring plates comprise base portions in contact with the spring pieces and extension portions located at two sides of the base portions; the extension portions extend along a projections of the spring pieces on a plane where the base portions are located; wherein the thoracic arch spring is mounted on a mounting plate below, and a spacer is disposed between the mounting plate and the limit spring plate located below the thoracic arch spring.

2. A thoracic arch spring teaching aid of claim 1, wherein the ends of the extension portions away from the base portions are curved.

3. A thoracic arch spring teaching aid of claim 1, wherein the spacer is a rubber pad.

4. A thoracic arch spring teaching aid of claim 1, further comprising a guiding mechanism connected to the upper and lower ends of the thoracic arch spring.

5. A thoracic arch spring teaching aid of claim 1, wherein the guiding mechanism comprises a guide sleeve and a guide rod located in the guide sleeve.

6. A thoracic arch spring teaching aid of claim 5, wherein the guiding mechanism is mounted at one end to the mounting plate and at the other end to the limit spring plate located above the thoracic arch spring.

7. A thoracic arch spring teaching aid of claim 1, wherein a lower pressing plate for pressing the spring piece is disposed at a lower portion of the simulated thoracic cavity, and the lower pressing plate comprises fins at two sides attached onto the spring piece, and the ends of the fins are respectively in an arc shape.

8. A thoracic arch spring teaching aid of claim 1, wherein an upper pressing plate for pressing the spring piece is disposed at an upper portion of the simulated thoracic cavity.

9. A thoracic arch spring teaching aid of claim 1, wherein the extension portions respectively have a curved end that is curved away from the spring piece.

* * * * *